United States Patent [19]

Frühbuss

[11] Patent Number: 4,629,609
[45] Date of Patent: Dec. 16, 1986

[54] PROCESS OF REMOVING $SO_x$ AND $NO_x$ FROM WASTE GASES

[76] Inventor: Heinrich Frühbuss, Hubert-Reissnerstr. 5a, 8032 Gräfelfing, Fed. Rep. of Germany

[21] Appl. No.: 674,018

[22] Filed: Nov. 21, 1984

[30] Foreign Application Priority Data

Nov. 24, 1983 [DE] Fed. Rep. of Germany ....... 3342500

[51] Int. Cl.$^4$ ............ B01J 8/00; C01B 21/00; C01B 17/00
[52] U.S. Cl. ............................ 423/239; 423/244
[58] Field of Search ............ 423/235, 239, 239 A, 423/244 A, 244 R

[56] References Cited

U.S. PATENT DOCUMENTS

| 3,887,683 | 6/1975 | Abe et al. ............................ 423/239 |
| 4,272,497 | 6/1981 | Takahashi et al. ................... 423/239 |
| 4,400,363 | 8/1983 | Grochowski et al. ............... 423/239 |
| 4,469,662 | 9/1984 | Hamada et al. ..................... 423/239 |
| 4,500,501 | 2/1985 | Hamada et al. ..................... 423/239 |

FOREIGN PATENT DOCUMENTS 55-81728  6/1980  Japan ............................. 423/239 A Primary Examiner—Gregory A. Heller
Attorney, Agent, or Firm—Michael J. Striker

[57] ABSTRACT

In a process for removing $SO_x$ and $NO_x$ from waste gases, $SO_x$ will substantially completely be removed from the waste gases either in a first or single step or in several steps, and this preferably by means of adsorption coke (activated carbon) having an adsorptive capacity for $SO_2$ of above 40 g $SO_2$ per kg of coke, whereupon the thus pre-cleaned gas will be subjected to a secondary treatment after admixture having $NH_3$ using catalysts of an absorptive capacity for $SO_2$ of below 10 g $SO_2$ per kg of catalyst, preferably below 5 g of catalyst, by reduction of $NO_x$ to $N_2$.

7 Claims, 1 Drawing Figure

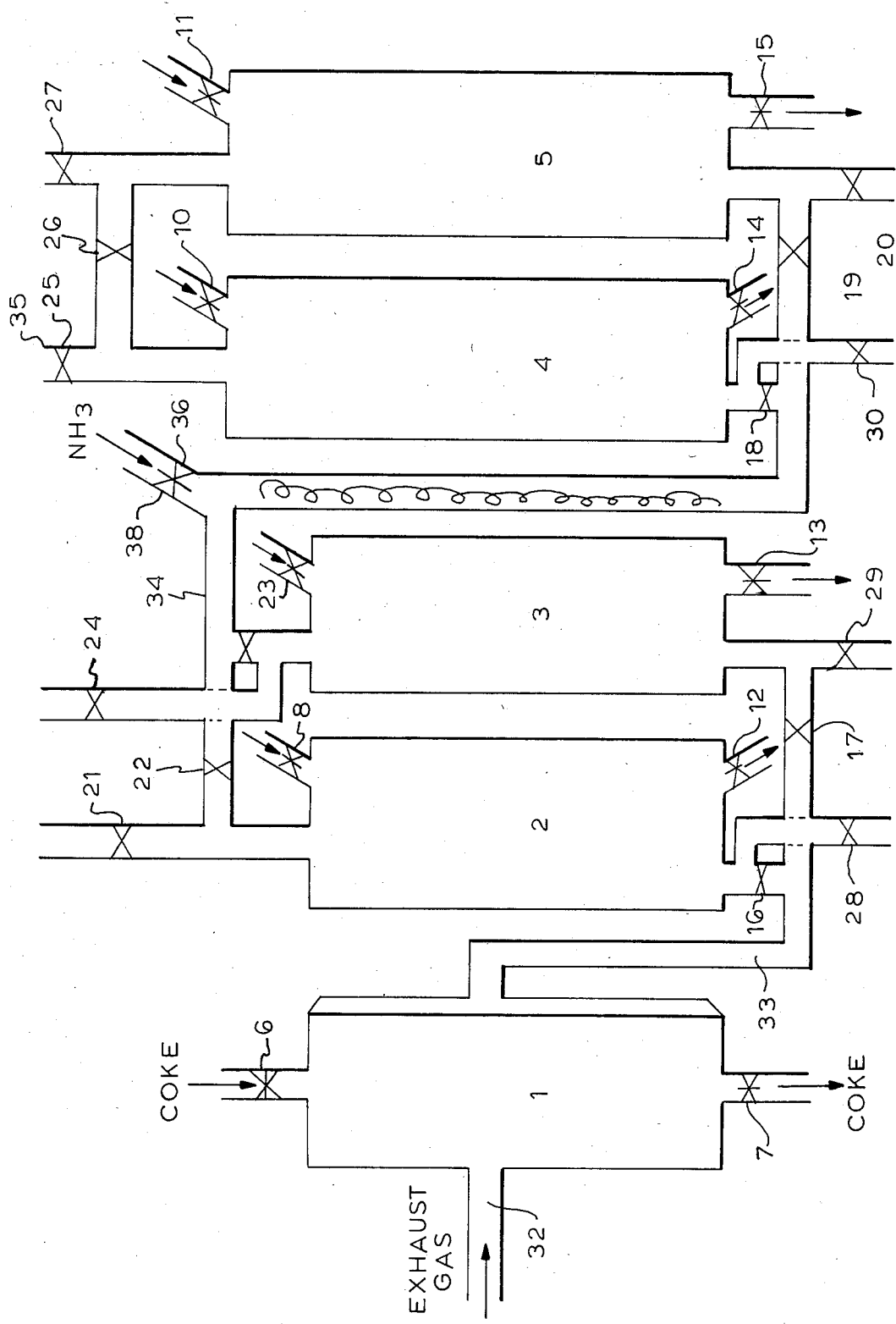

PROCESS OF REMOVING $SO_x$ AND $NO_x$ FROM WASTE GASES

The present invention relates to a process of removing $SO_x$ and $NO_x$ from waste gases. These oxides are present in varying proportions in the waste gases and derive in particular from burning of combustibles and nitrogen-containing waste and, due to the noxious effect on the environment, have to be removed prior to gas discharge from the stack.

According to a well-known procedure $SO_x$ is removed from gases in a dry-type process, between 70° and 200° C., by means of activated carbon and in the presence of ammonia. In this case $NO_x$ is partially reduced to $N_2$, especially if the activated carbon has been impregnated with vanadium pentoxide or with catalysts having a similar effect. The method inevitably leads to an enrichment of the activated carbon with salts, e.g. ammonium sulphate and ammonium nitrate. The activated carbon, therefore, need continuous replacement and/or reactivation. It is furthermore an established practice to adsorb in a first process step most of the $SO_x$ and to reduce in a second step, upon addition of $NH_3$, the $NO_x$ to $N_2$ by means of coke which also have a relatively good adsorptive capacity for $SO_2$. As the $NO_x$ is most efficiently reduced by fresh activated carbon, it has been suggested to use up, during the first step, all of the coke charged with $SO_2$ and to run the second step always with fresh activated carbon. This will, however, not avoid a relatively fast contamination of the activated carbon in the second step by ammonium sulphate and ammonium nitrate.

According to the present invention, however, the second step is run using a catalyst whose adsorptive capacity for $SO_2$ is below abt. 10 g $SO_2$, preferably below 5 g, for each kg of catalayst. The beneficial effect of this procedure and of the preceding thorough removal of the $SO_x$ from the waste gas will be that rapid contamination of the costly catalyst is avoided and its effectiveness thus considerably extended.

The invention thus refers to a method of removing $SO_x$ and $NO_x$ from waste gases and is characterized by that either in a first (single) step or in several steps $SO_x$ is substantially completely removed from the waste gas, whereupon the thus pretreated gas will, after admixture of $NH_3$, be subjected to a secondary purification by means of a catalyst having an adsorptive capacity of below 10 g $SO_2$ per kg of catalyst, preferably below 5 g per kg of catalyst, which reduces the $NO_x$ to $N_2$. In this case $NH_3$ will be admixed barely in a volume required for effecting the reduction—roughly according to the formula $2NO_x + 2NH_3 \rightarrow 2N_2 + 3H_2O$—, since the reaction between $NO_x$ and $NH_3$, provided there is a thorough mixing of the gases, is essentially a quantitative one.

The complete or substantially complete removal of $SO_x$ from the waste gas (ideally down to 400 ppm $SO_x$) can be brought about either by means of adsorption coke (activated carbon) whose adsorptive power for $SO_2$ is preferably above 40 g per kg of coke, or of wet scrubbing, e.g. on a Ca ion basis and, if need be, with subsequent dry purification.

According to the invention, the second process step is run using a catalyst having the said low adsorptive capacity for $SO_2$ and being, moreover, highly effective in reducing the $NO_x$ to $N_2$. They are, in particular, catalysts containing as the effective constituents Al-, Cu-, Co-, Ni-, Fe- and/or vanadium oxide. As carrier substances for these oxides there come into consideration specifically the known granular refractory materials based on $\alpha$ or $\gamma Al_2O_3$, $SiO_2$ and/or CaO, and also fire-clay and sillimanite.

Owing to their good reactivating properties, there are used for the second process step preferably those cokes which are impregnated with the said catalytically effective oxides. As carrier substance there can be used all of those cokes possessing the desirable low adsorptive power for $SO_2$. Such cokes may have been produced by thermal treatment of carbonaceous materials under exclusion of air, at 300° up to 600° C. or, alternatively, at higher temperatures up to above 1,000° C. As mentioned earlier, among the effective oxides are those of copper, cobalt, nickel, iron, aluminium and/or vanadium.

According to a preferred embodiment of the invention, the coke used in the second process step will be a coke produced by the treatment of a mineral oil. These cokes will generally contain less than 10% volatiles and abt. 0.5 up to 3% by wt. of vanadium pentoxide and/or other metal oxides. It is recommended to subject these cokes—prior to feeding them to the second process step viz. the appertaining vessel—to a thermal treatment under exclusion of air, at a temperature of between 300° C. and 800° C. It is also in this temperature range that their from time to time necessary reactivation is brought about.

A specific advantage of the process of this invenion is to be seen in that during the second process step any continuous substitution of the catalyst bed can be dispensed with, given the extraordinarily long-lasting effectiveness of the relevant catalyst. As a consequence, two simple vessels which can be switched over to the waste gas may be used instead of the complicated and defect-prone moving bed reactors.

A from time to time required reactivation of the catalyst may be done either using inert gas, waste gas, or steam or other, preferably reducing a gas, at 300° to 800° C.

One advantage of using coke as carrier material is that spent coke can either be burnt or possibly transformed into activated carbon.

To determine the adsorptive capacity of the coke of the first step as well as of the catalyst of the second step, a 50 cm high column consisting of the to be tested coke was flowed through in upward direction by a waste gas containing 0.5% by vol. of $SO_2$, 19.5% by vol. of $CO_2$ and 80% by vol. of $N_2$, at 150° C., until the presence of $SO_2$ was found in the gas discharge. The lower half of the coke column was used to determine by way of analysis—by aeration with $N_2$ at 200° C.—the adsorptive capacity for $SO_2$ per kg of coke. The adsorptive capacity of the catalyst to be used in the second process step was determined similarly.

DESCRIPTION OF DRAWING

The invention will be explained in more detail, hereafter, by way of the enclosed drawing. The plant consists of the moving bed reactor 1 and of the vessels 2 through 5 for batchwise feeding of coke and catalyst.

Reference Numerals 6 and 7 denote the continuous feed and withdrawal of coke, whereas FIGS. 8 through 15 denote the locks for the batchwise feed and withdrawal of catalysts and catalysts.

Valves 16 and 20 serve for adjusting the supply of waste gases to vessels 2 through 5, whereas valves 21 through 27 are meant for adjusting the discharge of gases from the above vessels.

The supply pipes 28 through 31 are for feeding hot gases to the system.

Gas purification in the vessels 1, 2 and 4 as well as the reactivation of coke and catalyst in vessels 3 and 5 is done with the following valve setting (+ stands for opened, − for closed): 16+; 17−; 21−; 22+; 23−; 18+; 19−; 25+; 26−.

The gas flows via duct 12 through vessel 1, duct 13, vessel 2, duct 34 into vessel 4 and is discharged to the atmosphere via duct 35.

In the meantime, the coke in vessels 3 and 5 can be reactivated by hot gases, with valve settings 29+; 24+ as well as 20+ and 27+.

Similar valve settings apply to the operation of vessels 3 and 5 and to the simultaneous reactivation of vessels 2 and 4 viz. to the operation of vessels 2 and 5 and reactivation of vessels 3 and 4.

Depending on the effectiveness of the activated coke in reactor 1, which latter may be of a discretional construction height, vessels 2 and 3 can be dispensed with.

NH$_3$ is introduced via duct 36 and valve 38 into duct 34. The coil incorporated in duct 34 is meant to promote mixing of the pretreated waste gases with NH$_3$.

EXAMPLE

A waste gas is passed, at 700 h$^{-1}$ space velocity (referred to normal temperature) through a reactor 1 of 1 m cross-section and 6 m height. This waste gas contains 0.07% by vol. of NO$_x$ and 0.1% by vol. of SO$_x$, besides O$_2$, CO$_2$ and N$_2$ in varying proportions. The moving bed of reactor 1 consists of low-temperature coke having an adsorptive capacity of 45 g SO$_2$ per kg. Vessels 2 and 3 are filled with similar coke. On its discharge from reactor 1 the waste gas contains 0.01% by vol. of SO$_x$ which are reduced to 0.005% by vol. upon the gas having passed through vessel 2.

To this precleaned waste gas will then be admixed via duct 36, NH$_3$ in a volume of 0.8% by vol. (referred to the waste gas). The waste gas then flows through vessel 4 which is filled with an Al$_2$O$_3$ catalyst having been impregnated by 0.05% by wt. of copper oxide and iron oxide and possessing an adsorptive capacity for SO$_2$ of 1 g SO$_2$ per KG of catalyst. In the waste gas discharged from duct 35 no traces of NO$_x$ were found. The same result was achieved when vessel 4 had been filled with a catalyst of vanadium-containing petrol coke.

For manufacturing the above catalyst, a coke-like mineral oil residue containing 4% vanadium pentoxide and having a granular size of between 2 and 20 mm was heated to 650° C. in a rotary furnace in order to remove the remaining volatile matter. Upon cooling down the material was ground of between 0.05 and 1.5 mm, then intimately blended with 20% by wt. of pitch (softening point according to Krämer-Sarnow: 40° C.) and 15% by wt. of water and passed through an extruder to give molded shapes of 4 mm diameter.

The molded shapes were gradually heated to 650° C. in a rotary furnace under exclusion of air and then allowed to cool down after 30 minutes.

In the above manner coke-like residues from mineral oil treatment can be completely (100%) transformed into catalysts. Instead of the said procedure the mineral oil residues may, alternatively, be reduced carefully to abt. 4 mm grain size. These fractions will, however, not be of the same high abrasive strength as the molded coke whose catalytic effectiveness is—surprisingly—not affected by binding them to pitch, bitumen or the like.

Although the process according to the invention was explained by way of dry adsorption of SO$_2$, the quasi complete adsorption of SO$_x$ may be achieved as well by wet scrubbing for the obvious reason that the effectiveness of the following catalysts will, in general, not be impaired by steam.

I claim:

1. Process of removing So$_x$ and NO$_x$ from waste gases which comprises the steps of and in sequence (1) removing substantially all of the SO$_x$ present in the gas by contacting said waste gas with an adsorptive coke having an adsorptive capacity for SO$_2$ of above 40 g SO$_2$ per kg of coke, (2) introducing NH$_3$ into the gas now substantially free of SO$_x$, (3) subjecting the NH$_3$ containing gas to contact with a catalyst having an adsorptive capacity for SO$_2$ of below 10 g per kg of catalyst containing as effective ingredient at least one member of the group of aluminum, copper, cobalt, nickel, iron and vanadium oxide supported on coke for reducing the NO$_x$ to N$_2$, and (4) recovering the SO$_x$ and NO$_x$ free gas.

2. Process according to claim 1, wherein said SO$_x$ is substantially completely removed in step 1 by contacting said waste gas with an adsorptive coke wherein said absorptive coke is activated carbon.

3. Process according to claim 1 wherein said catalyst in step 3 has an adsorptive capacity for SO$_x$ of below 5 g per kg of catalyst.

4. Process according to claim 1 wherein said NH$_3$ is introduced into said gas substantially free of SO$_x$ according to the formula 2NO$_x$+2NH$_3$→2N$_2$+3H$_2$O.

5. Process according to claim 1 wherein the catalyst used in step 3 is at least in part obtained in the treatment of mineral oils.

6. Process according to claim 2 wherein said first step is carried out in a moving bed treatment zone.

7. Process according to claim 2 wherein said first step is carried out in a moving bed treatment zone and said third step is carried out in a stationary bed treatment zone.

* * * * *